Oct. 25, 1955          W. H. MURSCH ET AL            2,721,739
                   APPARATUS FOR POSITIONING STRIP
                       Filed April 17, 1952
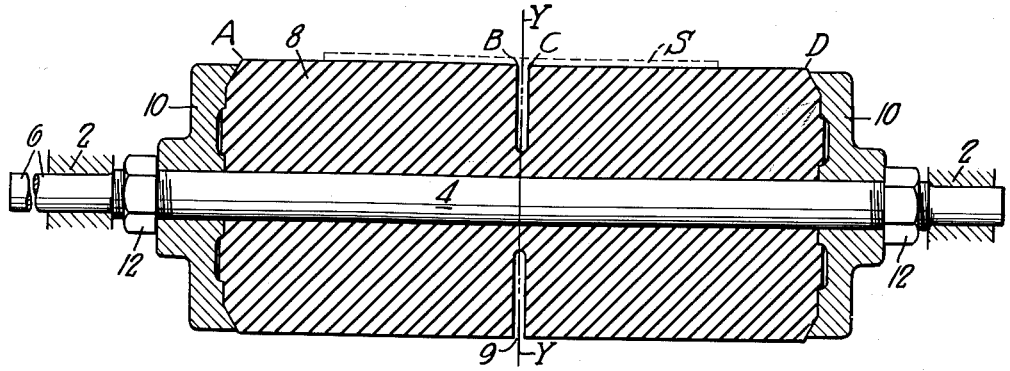
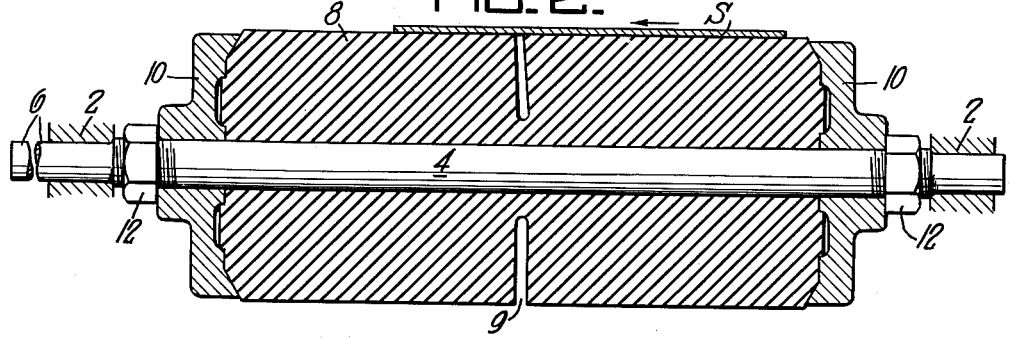
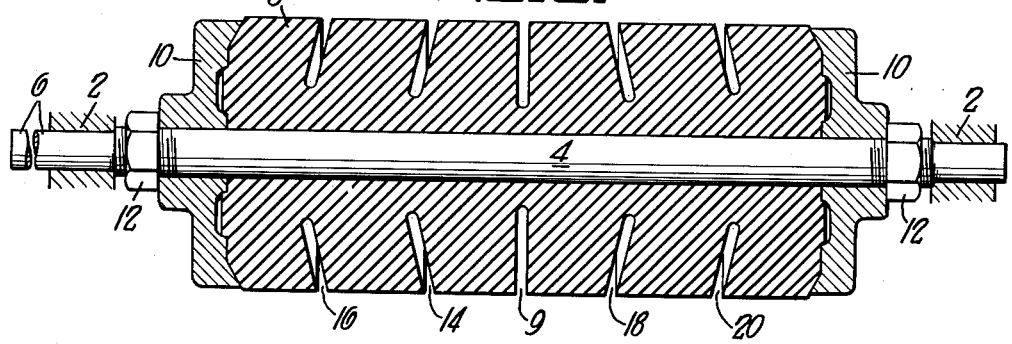
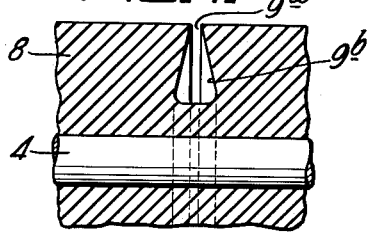
*Inventors:*
WILLIAM H. MURSCH and
HOWARD S. ORR,
by: Donald G. Dalton
   *their Attorney.*

United States Patent Office 2,721,739
Patented Oct. 25, 1955

2,721,739
APPARATUS FOR POSITIONING STRIP

William H. Mursch and Howard S. Orr, Pittsburgh, Pa., assignors to United States Steel Corporation, a corporation of New Jersey Application April 17, 1952, Serial No. 282,742

1 Claim. (Cl. 271—2.6)

This invention relates to apparatus for automatically centering and aligning moving objects, especially strip and strip-like materials. In the processing of metal strip, the strip is conveyed over rolls in the uncoiled condition. When the strip is conveyed over a roll to the processing equipment it is likely that the strip will be fed at a slight angle to the roll. Because of this, the strip will work its way across the face of the roll. In addition, the camber and/or lateral curvature which is present in the finished strip due to rolling difficulties causes the strip to approach the roll at an angle, this also causing the strip to move across the face of the roll. In order to keep the strip in the desired path of travel, various expedients have been resorted to. One of the most common is the use of stationary or rotatable side guides against which the edges of the strip bear. In some instances side guides have been used in conjunction with looper pits to force the strip back on the desired center line. The use of abnormally high strip tension has been tried in an attempt to keep the strip aligned. Another method of operation is to periodically slip or slue the strip back into its aproximate proper position on the conveying roll. All of the above methods of centering strip tend to abrade and mutilate the strip edges and in some instances cause the edges of the strip to be stretched beyond the elastic limit of the metal. Diagonal or lateral surface scratches are also formed on finely finished flat products of all kinds, these scratches being detrimental to subsequent operations and together with edge damage result in the scrapping of a large percentage of the material being processed. The problems discussed above also exist in belt conveyors and drive belts used in conjunction with belt pulleys. If the belt is made of rubber or other relatively soft material, it is more easily damaged. In addition to the methods of aligning strip mentioned above, crown rolls have been used to center materials having a low modulus of elasticity such as textiles, rubber and composition belts.

One type of apparatus for centering and aligning strip is shown in the copending application of Lorig, Serial No. 138,389, filed January 13, 1950, now Patent No. 2,592,581, dated April 15, 1952. The apparatus shown therein consists of a roll which may be made of rubber or similar material or of flexible metal discs. The apparatus of the present invention is a modification of the apparatus shown therein and has been developed for specific applications.

It is an object of our invention to provide apparatus for automatically centering a moving object without the use of side guides or abnormal tensioning of the strip.

This and other objects will be more apparent after referring to the following specification and attached drawings, in which:

Figure 1 is a sectional view of one specific embodiment of our invention;

Figure 2 is a view, similar to Figure 1, showing a load applied thereto;

Figure 3 is a sectional view of a second embodiment of our invention; and

Figure 4 is a fragmentary view of a modified detail.

Referring more particularly to the drawings, the reference numeral 2 refers to a pair of spaced apart bearings for receiving a roll shaft 4. An extension 6 may be provided at one end of the shaft 4 for driving the shaft. Surrounding the shaft 4 and mounted for rotation therewith is a rubber roll body 8. In place of rubber the roll body 8 may be made of neoprene or other elastic material. The roll body 8 is provided with a circumferential groove or slot 9 of considerable depth. A web 10 surrounds the shaft at each end and bears against the roll body 8. A nut 12 is screwed on each end of the shaft 4 and cooperates to hold the web 10 in close engagement with the roll body 8. The outside diameter of the web 10 must be only slightly less than that of the roll body 8.

The operation of this device is as follows: When a strip S passes over the surface of the roll body 8 under tension all surface points on the lines AB and CD will move slightly toward the transverse axis YY. As points B and C draw closer together (Figure 2) as the result of the radial pressure, points on lines AB and DC will move toward axis YY without appreciably moving toward the axis of the shaft 4. As long as the strip is centered on the roll no lateral movement of the strip will occur when it is conveyed thereover. If, however, the strip is off-center toward the right as shown in Figure 2 there will be a greater total force tending to move the strip to the left and the strip will move until it becomes centered. If the strip is off-center to the left there will be a greater total force tending to move the strip to the right and the strip will move to the right until it is centered. If it were not for the flanges 10 which confine the rubber of the roll body, movement of the rubber roll body 8 toward the axis YY would not be assured since it would be possible for the rubber to move away from the axis YY.

In the embodiment of Figure 3 additional slots 14, 16, 18 and 20 are provided in the roll body 8. These slots extend from the roll surface inwardly toward the axis of the shaft 4 and away from the axis YY. The use of these additional slots increases the centering action of the roll and brings the strip S back to its centered position faster and requires less tension.

In Figure 4 the central circumferential slot 9a is provided with undercut portions 9b which permit movement of the rubber under less load than the slots 9 of Figures 1 to 3.

While several embodiments of our invention have been shown and described it will be apparent that other adaptations and modifications may be made without departing from the scope of the following claim.

We claim:

Apparatus for automatically centering a moving object comprising a rotatable roll body of uniform elastic material over which the object passes, said roll body having a single narrow circumferential groove of considerable depth, said groove being located approximately at the transverse center thereof, and a relatively rigid web bearing against each end of the roll body, said webs having a diameter substantially as great as that of the roll body and substantially greater than the diameter of the bottom of said groove.

References Cited in the file of this patent
UNITED STATES PATENTS

| Number | Name | Date |
|---|---|---|
| 277,154 | Osborne | May 8, 1883 |
| 503,019 | Walscheid | Aug. 8, 1893 |
| 1,370,709 | Smith | Mar. 8, 1921 |
| 1,727,978 | Huebner | Sept. 10, 1929 |
| 2,343,363 | Black et al. | Mar. 7, 1944 |
| 2,592,581 | Lorig | Apr. 15, 1952 |